(12) United States Patent
Ganireddy et al.

(10) Patent No.: US 10,784,685 B2
(45) Date of Patent: Sep. 22, 2020

(54) ELECTRICAL POWER SYSTEMS AND SUBSYSTEMS

(71) Applicant: General Electric Company, Schenectady, NY (US)

(72) Inventors: Govardhan Ganireddy, Roanoke, VA (US); Saurabh Shukla, Clifton Park, NY (US); Sumeet Singh Thakur, Bangalore (IN); Robert Gregory Wagoner, Roanoke, VA (US); Anthony Michael Klodowski, Hardy, VA (US); Yashomani Kolhatkar, Bangalore (IN)

(73) Assignee: General Electric Company, Schenectady, NY (US)

( * ) Notice: Subject to any disclaimer, the term of this patent is extended or adjusted under 35 U.S.C. 154(b) by 242 days.

(21) Appl. No.: 15/588,878

(22) Filed: May 8, 2017

(65) Prior Publication Data

US 2018/0323619 A1 Nov. 8, 2018

(51) Int. Cl.
*H02J 1/10* (2006.01)
*H02J 3/38* (2006.01)
*H02M 5/458* (2006.01)

(52) U.S. Cl.
CPC .............. *H02J 3/38* (2013.01); *H02M 5/4585* (2013.01); *H02J 2300/28* (2020.01)

(58) Field of Classification Search
CPC .......... H02J 3/386; H02J 3/38; H02J 2300/28; H02M 5/4585; Y02E 10/763
See application file for complete search history.

(56) References Cited

U.S. PATENT DOCUMENTS

| | | | |
|---|---|---|---|
| 3,593,106 A | 7/1971 | Lafuze | |
| 4,281,371 A | 7/1981 | Baker | |
| 5,047,910 A | 9/1991 | Levran et al. | |
| 7,119,452 B2 | 10/2006 | Larsen | |
| 7,166,928 B2 | 1/2007 | Larsen | |

(Continued)

FOREIGN PATENT DOCUMENTS

| EP | 1276219 A1 | 1/2003 |
|---|---|---|
| WO | WO2009/138808 A1 | 11/2009 |

OTHER PUBLICATIONS

Baron et al., Breaking the 34.5kV Standard, Drawing on hydro experience, Acciona extols use of 12kV collection system to lower energy costs through elimination of step-up transformers, Wind Systems Magazine, Apr. 2013, pp. 48-54.

(Continued)

*Primary Examiner* — Rexford N Barnie
*Assistant Examiner* — Rasem Mourad
(74) *Attorney, Agent, or Firm* — Dority & Manning, P.A.

(57) ABSTRACT

An electrical power subsystem includes a generator comprising a generator stator and a generator rotor, and a power converter electrically coupled to the generator. The power converter includes a plurality of rotor-side converters electrically coupled in parallel, a line-side converter, and a regulated DC link electrically coupling the plurality of rotor-side converters and the line-side converter. The electrical power subsystem further includes a stator power path for providing power from the generator stator to the power grid, and a converter power path for providing power from the generator rotor through the power converter to the power grid.

10 Claims, 9 Drawing Sheets

(56) References Cited

U.S. PATENT DOCUMENTS

| | | | |
|---|---|---|---|
| 7,187,566 B2 | 3/2007 | Kawashima et al. | |
| 7,212,421 B2 | 5/2007 | Chandra et al. | |
| 7,224,081 B2 | 5/2007 | Larsen | |
| 7,521,907 B2 | 4/2009 | Cervera et al. | |
| 7,923,862 B2 | 4/2011 | Cardinal et al. | |
| 8,013,580 B2 | 9/2011 | Cervera et al. | |
| 8,041,465 B2 | 10/2011 | Larsen et al. | |
| 8,659,178 B2 | 2/2014 | Arlaban Gabeiras et al. | |
| 8,669,669 B1 | 3/2014 | Wagoner et al. | |
| 8,736,241 B2 | 5/2014 | Cervera et al. | |
| 9,537,437 B2 | 1/2017 | Wagoner et al. | |
| 9,587,626 B2 | 3/2017 | Sadaba et al. | |
| 2006/0214428 A1* | 9/2006 | Altemark | H02J 3/38 290/44 |
| 2008/0157530 A1 | 7/2008 | Corcelles Pereira et al. | |
| 2009/0085354 A1* | 4/2009 | Tan | H02P 6/183 290/44 |
| 2009/0322081 A1* | 12/2009 | Wagoner | H02M 7/493 290/44 |
| 2010/0219634 A1* | 9/2010 | Arlaban Gabeiras | F03D 7/0284 290/44 |
| 2011/0074365 A1* | 3/2011 | Nakayama | H02P 9/007 322/27 |
| 2012/0155125 A1 | 6/2012 | Zhang et al. | |
| 2013/0182465 A1* | 7/2013 | Wang | H02J 3/386 363/34 |
| 2013/0286692 A1 | 10/2013 | Patel et al. | |
| 2013/0289911 A1 | 10/2013 | Patel et al. | |
| 2014/0140112 A1* | 5/2014 | Zhou | H02M 1/12 363/40 |
| 2014/0203559 A1* | 7/2014 | Wagoner | H02M 5/4585 290/44 |
| 2014/0247021 A1* | 9/2014 | Wagoner | H02P 9/007 322/47 |
| 2014/0253058 A1 | 9/2014 | Cervera et al. | |
| 2014/0320056 A1 | 10/2014 | Royak et al. | |

OTHER PUBLICATIONS

Olonso Sadaba et al., Wind Generation Control Strategies for Grid Integration Acciona Windpower Experience, ResearchGate, Acciona Windpower, S.A., uploaded 2015, 11 Pages. https://www.researchgate.net/publication/267966410.

International Search Report and Written Opinion issued in connection with corresponding PCT Application No. PCT/US2018/031307 dated Aug. 17, 2018.

* cited by examiner

ELECTRICAL POWER SYSTEMS AND SUBSYSTEMS

FIELD OF THE INVENTION

The present disclosure relates generally to electrical power systems and subsystems for providing power to a power grid from, for example, wind turbines.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

For example, FIGS. 1 and 2 illustrate a wind turbine 10 and associated power system suitable for use with the wind turbine 10 according to conventional construction. As shown, the wind turbine 10 includes a nacelle 14 that typically houses a generator 28 (FIG. 2). The nacelle 14 is mounted on a tower 12 extending from a support surface (not shown). The wind turbine 10 also includes a rotor 16 that includes a plurality of rotor blades 20 attached to a rotating hub 18. As wind impacts the rotor blades 20, the blades 20 transform wind energy into a mechanical rotational torque that rotatably drives a low-speed shaft 22. The low-speed shaft 22 is configured to drive a gearbox 24 (where present) that subsequently steps up the low rotational speed of the low-speed shaft 22 to drive a high-speed shaft 26 at an increased rotational speed. The high-speed shaft 26 is generally rotatably coupled to a generator 28 (such as a doubly-fed induction generator or DFIG) so as to rotatably drive a generator rotor 30. As such, a rotating magnetic field may be induced by the generator rotor 30 and a voltage may be induced within a generator stator 32 that is magnetically coupled to the generator rotor 30. The associated electrical power can be transmitted from the generator stator 32 to a main three-winding transformer 34 that is typically connected to a power grid via a grid breaker 36. Thus, the main transformer 34 steps up the voltage amplitude of the electrical power such that the transformed electrical power may be further transmitted to the power grid.

In addition, as shown, the generator 28 is typically electrically coupled to a bi-directional power converter 38 that includes a rotor-side converter 40 joined to a line-side converter 42 via a regulated DC link 44. The rotor-side converter 40 converts the AC power provided from the rotor 30 into DC power and provides the DC power to the DC link 44. The line side converter 42 converts the DC power on the DC link 44 into AC output power suitable for the power grid. Thus, the AC power from the power converter 38 can be combined with the power from the stator 32 to provide multi-phase power (e.g. three-phase power) having a frequency maintained substantially at the frequency of the power grid (e.g. 50 Hz/60 Hz).

As shown in FIG. 2, the illustrated three-winding transformer 34 typically has (1) a 33 kilovolt (kV) medium voltage (MV) primary winding 33 connected to the power grid, (2) a 6 to 13.8 kV MV secondary winding 35 connected to the generator stator 32, and (3) a 690 to 900 volt (V) low-voltage (LV) tertiary winding 37 connected to the line-side power converter 42.

Referring now to FIG. 3, individual power systems of a plurality of wind turbines 10 may be arranged in a predetermined geological location and electrically connected together to form a wind farm 46. More specifically, as shown, the wind turbines 10 may be arranged into a plurality of groups 48 with each group separately connected to a main line 50 via switches 51, 52, 53, respectively. In addition, as shown, the main line 50 may be electrically coupled to another, larger transformer 54 for further stepping up the voltage amplitude of the electrical power from the groups 48 of wind turbines 10 before sending the power to the grid.

One issue with such systems, however, is that the three-winding transformers 34 associated with each turbine 10 are expensive. Particularly, the secondary winding 35 of the transformer 34 that is connected to the generator stator 32 can be costly. Thus, it would be advantageous to eliminate such three-winding transformers from wind turbine power systems.

Another issue that needs to be addressed in power systems is harmonics. For example, if the secondary winding is eliminated, this results in lower impedance in the system. Thus, there is an increased risk of such systems not meeting certain agency requirements for harmonics. Accordingly, power systems which include features for reducing the harmonic currents being injected into the power grid, particularly in view of agency harmonics requirements, would be advantageous.

BRIEF DESCRIPTION OF THE INVENTION

Aspects and advantages of the invention will be set forth in part in the following description, or may be obvious from the description, or may be learned through practice of the invention.

In accordance with one embodiment, an electrical power subsystem for connection to a power grid is provided. The electrical power subsystem includes a generator comprising a generator stator and a generator rotor, and a power converter electrically coupled to the generator. The power converter includes a plurality of rotor-side converters electrically coupled in parallel, a line-side converter, and a regulated DC link electrically coupling the plurality of rotor-side converters and the line-side converter. The electrical power subsystem further includes a stator power path for providing power from the generator stator to the power grid, a converter power path for providing power from the generator rotor through the power converter to the power grid, and a partial power transformer provided on the converter power path.

In accordance with another embodiment, an electrical power subsystem for connection to a power grid is provided. The electrical power subsystem includes a generator comprising a generator stator and a generator rotor, and a power converter electrically coupled to the generator. The power converter includes a plurality of rotor-side converters electrically coupled in parallel, a line-side converter, and a regulated DC link electrically coupling the plurality of rotor-side converters and the line-side converter. The electrical power subsystem further includes a stator power path for providing power from the generator stator to the power grid, a converter power path for providing power from the generator rotor through the power converter to the power grid, and a transformer connecting the subsystem to the power grid. The electrical power subsystem further includes a controller coupled to the power converter, the controller configured to coordinate switching of the plurality of rotor-side converters to produce an interleaved switching pattern between the plurality of rotor-side converters.

In accordance with another embodiment, a method for operating an electrical power subsystem is provided. The electrical power subsystem includes a generator including a generator stator and a generator rotor. The electrical power subsystem further includes a power converter electrically coupled to the generator, the power converter including a plurality of rotor-side converters electrically coupled in parallel, a line-side converter, and a regulated DC link electrically coupling the plurality of rotor-side converters and the line-side converter. The electrical power subsystem further includes a stator power path for providing power from the generator stator to the power grid, a converter power path for providing power from the generator rotor through the power converter to the power grid, and a partial power transformer provided on the converter power path. The method includes switching the plurality of rotor-side converters to produce an interleaved switching pattern between the plurality of rotor-side converters.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
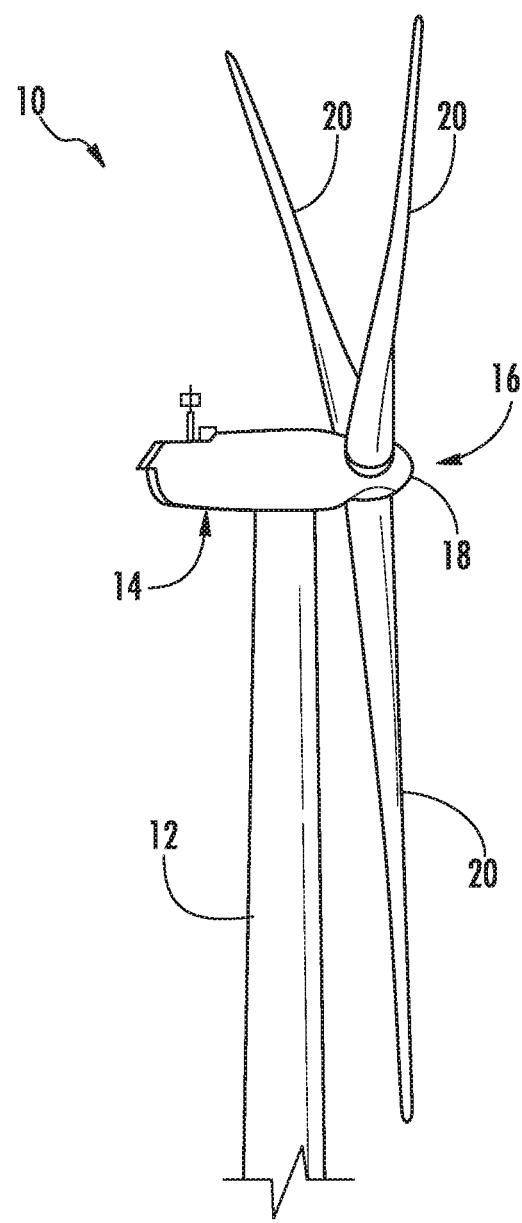
FIG. 1 illustrates a perspective view of a portion of one embodiment of a wind turbine according to conventional construction.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter is directed to electrical power systems for connection and providing power to a power grid with reduced harmonics. An electrical power system in accordance with the present disclosure may include a generator and a power converter electrically coupled to the generator. The power converter may include a plurality of rotor-side converters electrically coupled in parallel with each other. The use of multiple rotor-side converters instead of only a single rotor-side converter advantageously facilitates the reduction in harmonics. In some cases, such multiple rotor-side converters can further result in the elimination or a change in the location of a harmonic filter in the system. Further, in exemplary embodiments, switching patterns of the rotor-side converters may be coordinated to produce an interleaved switching pattern, with the switching phase of each rotor-side converter shifted from the others, resulting in significantly reduced harmonic currents being transmitted to the power grid. Further, any necessary filtering equipment can be designed for operation at the higher frequency resulting from the interleaved switching pattern, thus advantageously resulting in physically smaller and less costly equipment.

Figure 2:
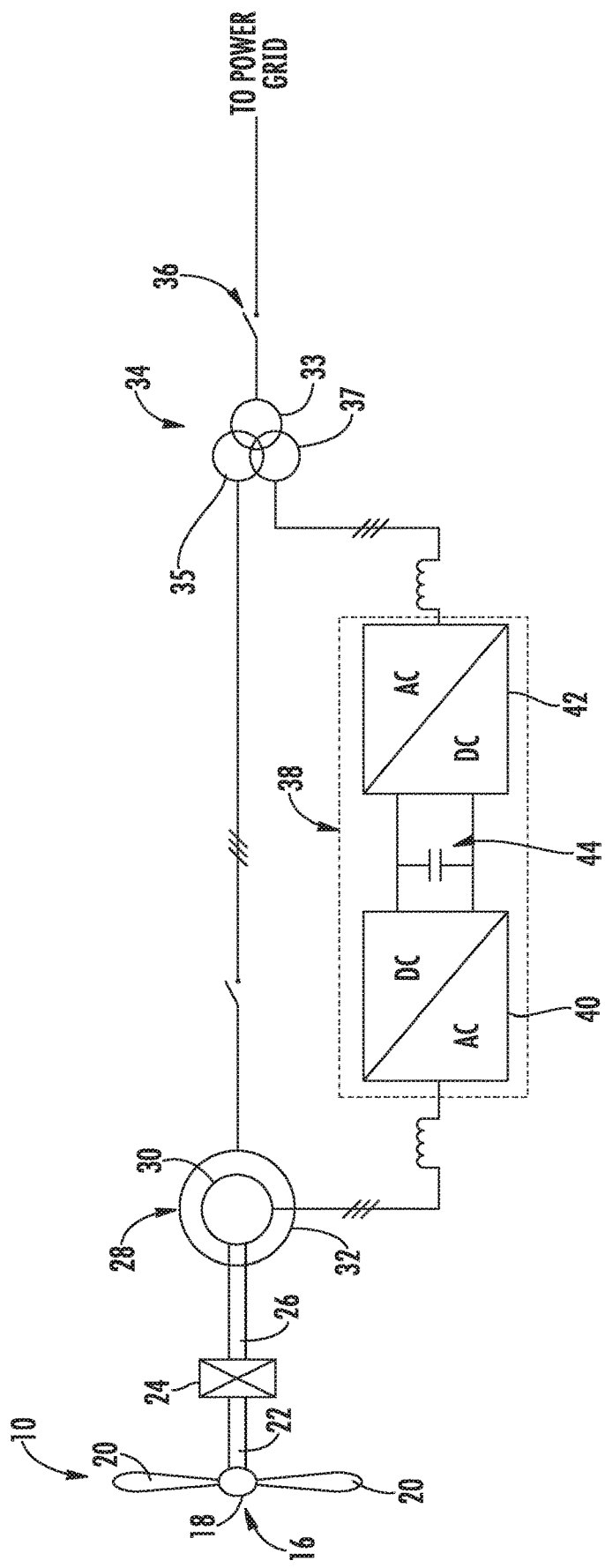
FIG. 2 illustrates a schematic diagram of a conventional electrical power system suitable for use with the wind turbine shown in FIG. 1.
Figure 3:
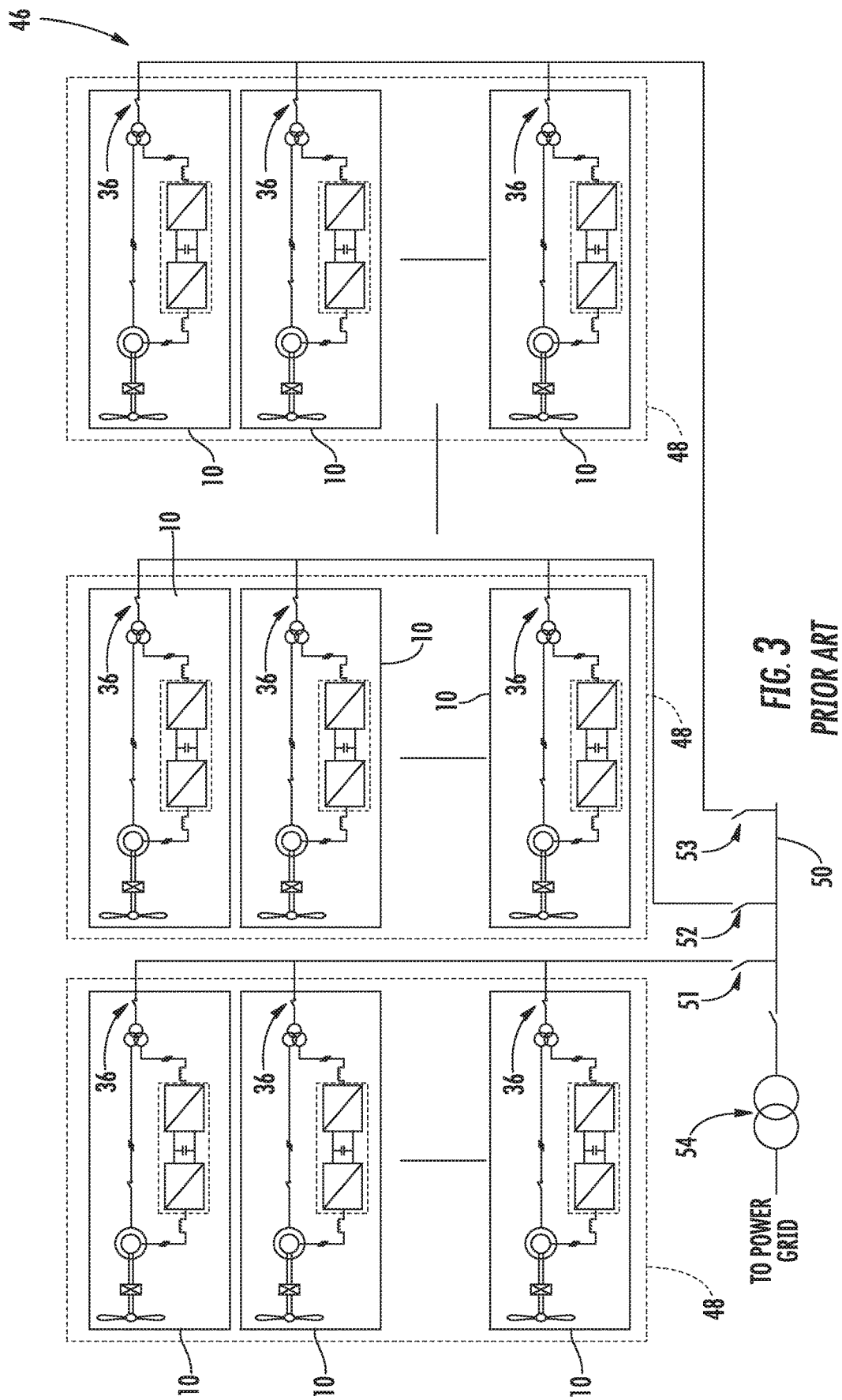
FIG. 3 illustrates a schematic diagram of one embodiment of a conventional wind farm according to conventional construction, particularly illustrating a plurality of wind turbine power systems such as those illustrated in FIG. 2 connected to a single sub-station transformer.
Figure 4:
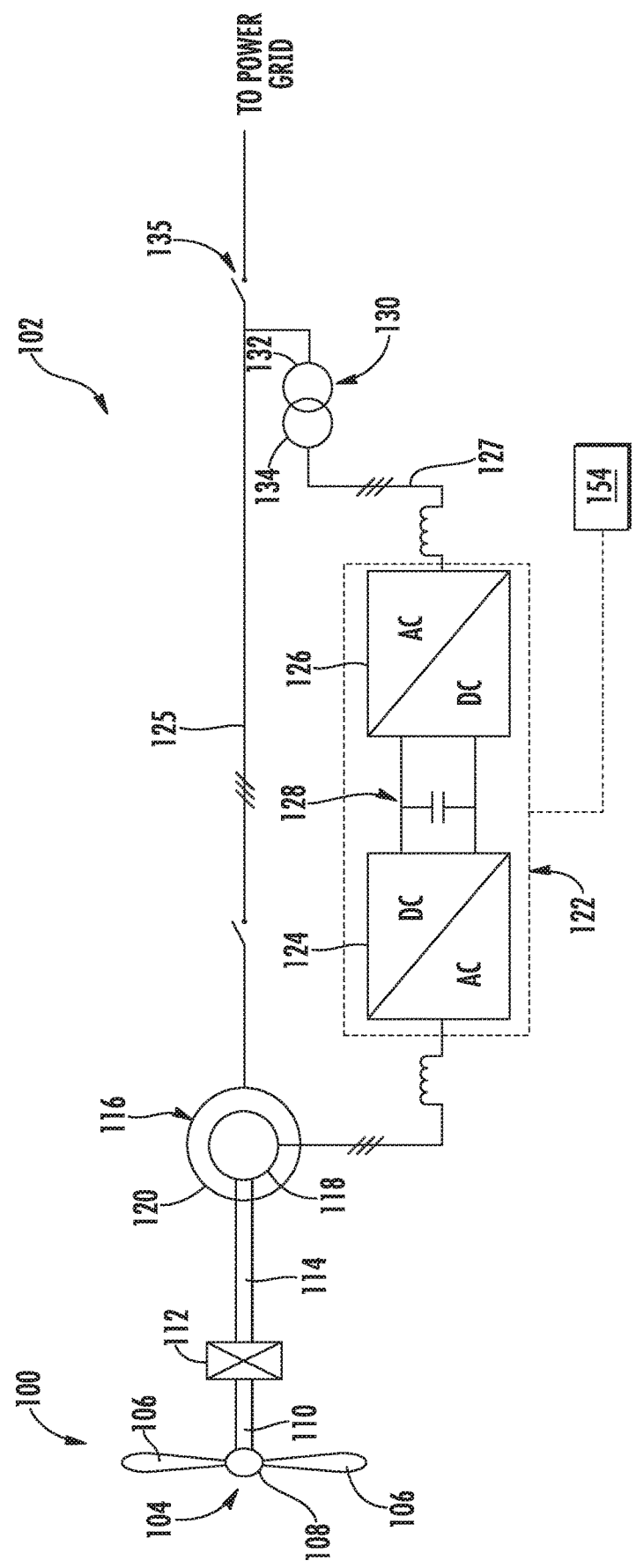
FIG. 4 illustrates a schematic diagram of one embodiment of an electrical power system for a wind turbine according to the present disclosure.

Referring now to FIG. 4, a schematic diagram of one embodiment of an electrical power subsystem 102 according to the present disclosure is illustrated. It should be understood that the term "subsystem" is used herein to distinguish between the individual power systems (e.g. as shown in FIG. 4 or FIG. 2) and the overall electrical power system 105 of FIG. 5 or FIG. 3 that includes a plurality of electrical power subsystems 102. Those of ordinary skill in the art, however, will recognize that the electrical power subsystem 102 of FIG. 4 (or FIG. 2) may also be referred to more generically, such as a simply a system (rather than a subsystem). Therefore, such terms may be used interchangeably and are not meant to be limiting.

Further, as shown, the electrical power subsystem 102 may correspond to a wind turbine power system 100. More specifically, as shown, the wind turbine power system 100 includes a rotor 104 that includes a plurality of rotor blades 106 attached to a rotating hub 108. As wind impacts the rotor blades 106, the blades 106 transform wind energy into a mechanical rotational torque that rotatably drives a low-speed shaft 110. The low-speed shaft 110 is configured to drive a gearbox 112 that subsequently steps up the low rotational speed of the low-speed shaft 110 to drive a high-speed shaft 114 at an increased rotational speed. The high-speed shaft 114 is generally rotatably coupled to a doubly-fed induction generator 116 (referred to hereinafter as DFIG 116) so as to rotatably drive a generator rotor 118. As such, a rotating magnetic field may be induced by the generator rotor 118 and a voltage may be induced within a generator stator 120 that is magnetically coupled to the generator rotor 118. In one embodiment, for example, the generator 116 is configured to convert the rotational mechanical energy to a sinusoidal, three-phase alternating current (AC) electrical energy signal in the generator stator 120. Thus, as shown, the associated electrical power can be transmitted from the generator stator 120 directly the grid.

In addition, as shown, the generator 116 is electrically coupled to a bi-directional power converter 122 that includes a rotor-side converter 124 joined to a line-side converter 126 via a regulated DC link 128. Thus, the rotor-side converter 124 converts the AC power provided from the generator rotor 118 into DC power and provides the DC power to the DC link 128. The line side converter 126 converts the DC power on the DC link 128 into AC output power suitable for the power grid. More specifically, as shown, the AC power from the power converter 122 can be combined with the power from the generator stator 120 via a converter power path 127 and a stator power path 125, respectively. For example, as shown, and in contrast to conventional systems such as those illustrated in FIGS. 1-3, the converter power path 127 may include a partial power transformer 130 for stepping up the voltage amplitude of the electrical power from the power converter 122 such that the transformed electrical power may be further transmitted to the power grid. Thus, as shown, the illustrated system 102 of FIG. 4 does not include the conventional three-winding main transformer described above. Rather, as shown in the illustrated embodiment, the partial power transformer 130 may correspond to a two-winding transformer having a primary winding 132 connected to the power grid and a secondary winding 134 connected to the line side converter 126. Notably, the partial power transformer may in some embodiments include a third auxiliary winding for auxiliary loads.

In addition, the electrical power subsystem 102 may include a controller 136 configured to control any of the components of the wind turbine 100 and/or implement the method steps as described herein. For example, as shown particularly in FIG. 6, the controller 136 may include one or more processor(s) 138 and associated memory device(s) 140 configured to perform a variety of computer-implemented functions (e.g., performing the methods, steps, calculations and the like and storing relevant data as disclosed herein). Additionally, the controller 136 may also include a communications module 142 to facilitate communications between the controller 136 and the various components of the wind turbine 100, e.g. any of the components of FIGS. 4 and 5. Further, the communications module 142 may include a sensor interface 144 (e.g., one or more analog-to-digital converters) to permit signals transmitted from one or more sensors 139, 141, 143 to be converted into signals that can be understood and processed by the processors 138. It should be appreciated that the sensors 139, 141, 143 may be communicatively coupled to the communications module 142 using any suitable means. For example, as shown in FIG. 6, the sensors 139, 141, 143 may be coupled to the sensor interface 144 via a wired connection. However, in other embodiments, the sensors 139, 141, 143 may be coupled to the sensor interface 144 via a wireless connection, such as by using any suitable wireless communications protocol known in the art. As such, the processor 138 may be configured to receive one or more signals from the sensors 139, 141, 143.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 138 is also configured to compute advanced control algorithms and communicate to a variety of Ethernet or serial-based protocols (Modbus, OPC, CAN, etc.). Additionally, the memory device(s) 140 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 140 may generally be configured to store suitable computer-readable instructions that, when implemented by the processor(s) 138, configure the controller 136 to perform the various functions as described herein.

In operation, alternating current (AC) power generated at the generator stator 120 by rotation of the rotor 104 is provided via a dual path to the grid, i.e. via the stator power path 125 and the converter power path 127. More specifically, the rotor side converter 124 converts the AC power provided from the generator rotor 118 into DC power and provides the DC power to the DC link 128. Switching elements (e.g. IGBTs) used in bridge circuits of the rotor side converter 124 can be modulated to convert the AC power provided from the generator rotor 118 into DC power suitable for the DC link 128. The line side converter 126 converts the DC power on the DC link 128 into AC output power suitable for the grid. In particular, switching elements (e.g. IGBTs) used in bridge circuits of the line side converter 126 can be modulated to convert the DC power on the DC link 128 into AC power. As such, the AC power from the power converter 122 can be combined with the power from the generator stator 120 to provide multi-phase power having a frequency maintained substantially at the frequency of the grid. It should be understood that the rotor side converter 124 and the line side converter 126 may have any configuration using any switching devices that facilitate operation of electrical power system as described herein.

Further, the power converter 122 may be coupled in electronic data communication with the turbine controller 136 and/or a separate or integral converter controller 154 to control the operation of the rotor side converter 124 and the line side converter 126. For example, during operation, the controller 136 may be configured to receive one or more voltage and/or electric current measurement signals from the first set of voltage and electric current sensors 139, 141, 143. Thus, the controller 136 may be configured to monitor and control at least some of the operational variables associated with the wind turbine 100 via the sensors 139, 141, 143. In the illustrated embodiment, the sensors 139, 141, 143 may be electrically coupled to any portion of electrical power subsystem 102 that facilitates operation of electrical power subsystem 102 as described herein.

It should also be understood that any number or type of voltage and/or electric current sensors may be employed within the wind turbine 100 and at any location. For example, the sensors may be current transformers, shunt sensors, rogowski coils, Hall Effect current sensors, Micro Inertial Measurement Units (MIMUs), or similar, and/or any other suitable voltage or electric current sensors now known or later developed in the art. Thus, the converter controller 154 is configured to receive one or more voltage and/or electric current feedback signals from the sensors 139, 141, 143. More specifically, in certain embodiments, the current or voltage feedback signals may include at least one of line feedback signals, line-side converter feedback signals, rotor-side converter feedback signals, or stator feedback signals.

Figure 5:
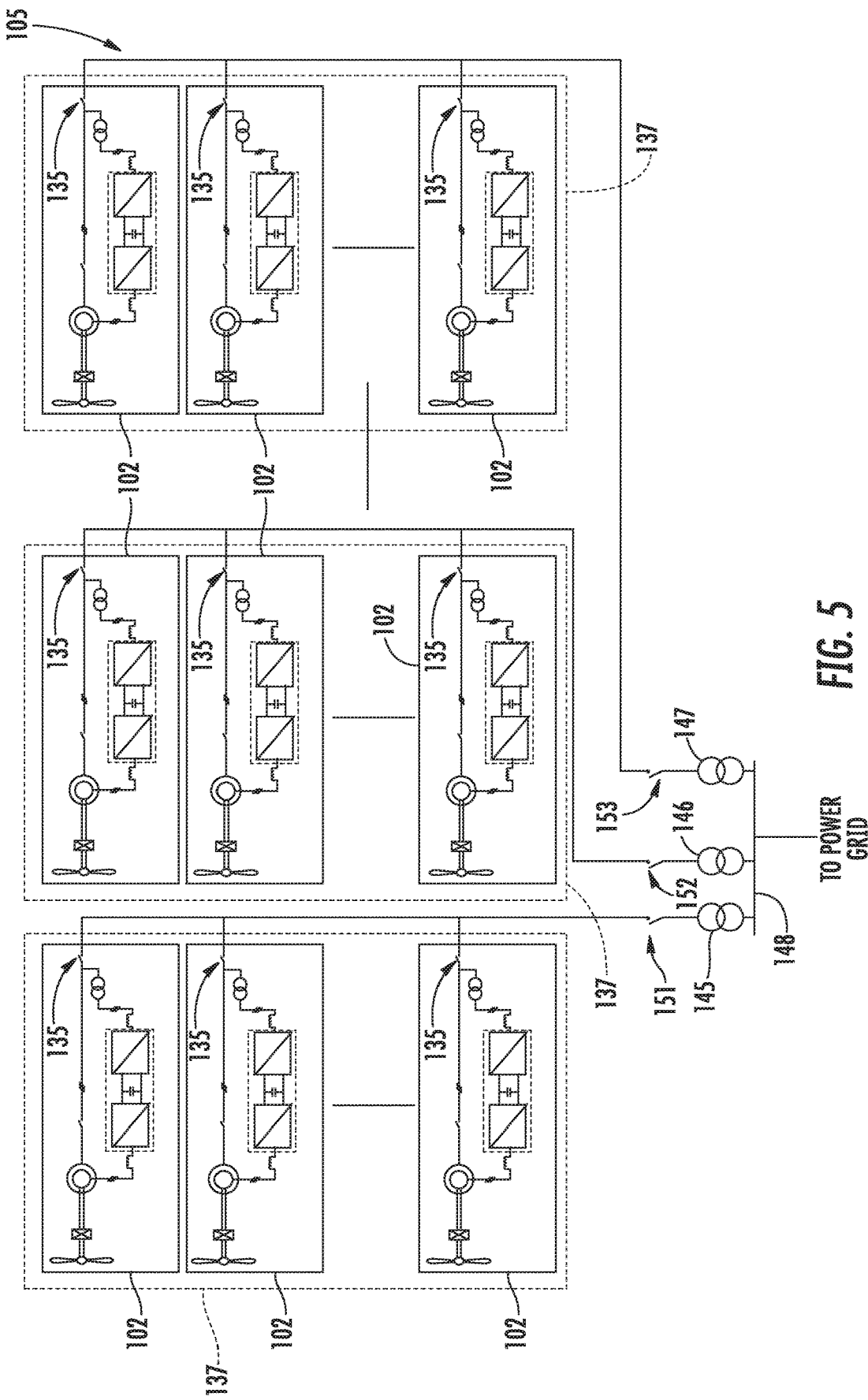
FIG. 5 illustrates a schematic diagram of one embodiment of a wind farm according to the present disclosure, particularly illustrating a plurality of wind turbine clusters each connected to the grid via a cluster transformer.
Figure 6:
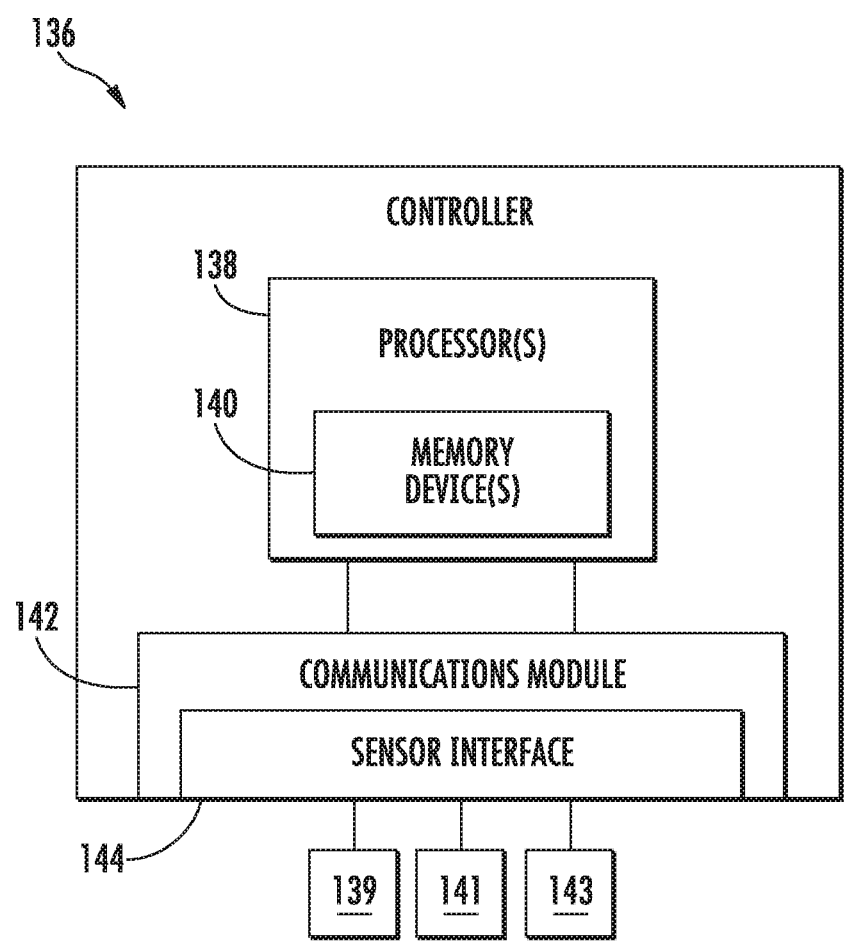
FIG. 6 illustrates a block diagram of one embodiment of a wind turbine controller according to the present disclosure.

Referring particularly to FIG. 5, individual power systems (such as the power subsystem 102 illustrated in FIG. 4) may be arranged in at least two clusters 137 to form an electrical power system 105. More specifically, as shown, the wind turbine power systems 100 may be arranged into a plurality of clusters 137 so as to form a wind farm. Thus, as shown, each cluster 137 may be connected to a separate cluster transformer 145, 146, 147 via switches 151, 152, 153, respectively, for stepping up the voltage amplitude of the electrical power from each cluster 137 such that the transformed electrical power may be further transmitted to the power grid. In addition, as shown, the transformers 145, 146, 147 are connected to a main line 148 that combines the power from each cluster 137 before sending the power to the grid. In other words, as shown, the stator power circuit of all the wind turbines 100 share a common ground reference provided by the neutral of the secondary winding 124 of the cluster transformer 145, 146, 147 or by a separate neutral grounding transformer. Each subsystem 102 may be connected to the cluster 137 via a subsystem breaker 135, as shown.

Referring now to FIGS. 7 through 10, various embodiments of electrical power subsystems 102 having improved harmonic reduction features are provided. It should be noted that, while such embodiments are illustrated in the context of subsystems using partial power transformers 130, such improved harmonic reduction features are equally applicable to subsystems using transformers 34, and such subsystems with such features are also within the scope and spirit of the present disclosure.

As illustrated, the power converter 122 may include a plurality of rotor side converters 124 rather than only a single rotor side converter 124. The rotor side converters 124 may be electrically coupled to each other and the DC link 128 in parallel, as shown. As discussed, the use of multiple rotor side converters 124 may facilitate the reduction in harmonics. The switching frequency components from the rotor side converter which typically contribute to the harmonic content include, for example:

FSW+/−N Fslip where FSW is switching frequency of the rotor-side converter; Fslip is fundamental frequency of the output voltage/current of the rotor-side converter; and N is a positive integer number. Accordingly, as the power rating of the subsystem 102 increases, additional rotor side converters 124 may be added. Such additional rotor side converters 124 may both meet higher current requirements and facilitate reduced harmonics.

Figure 7:
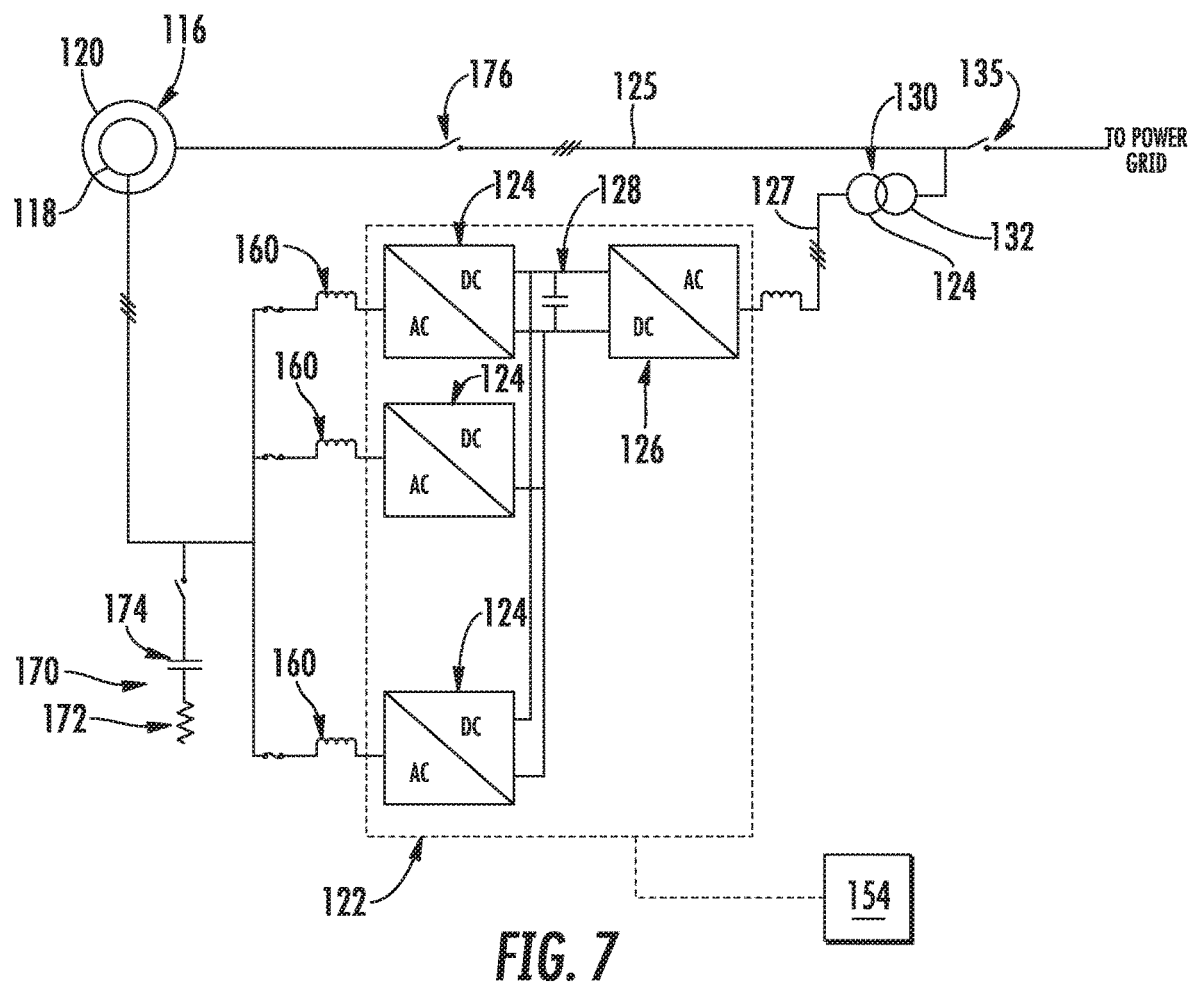
FIG. 7 illustrates a schematic diagram of one embodiment of an electrical power system for a wind turbine including harmonic reduction features according to the present disclosure.
Figure 8:
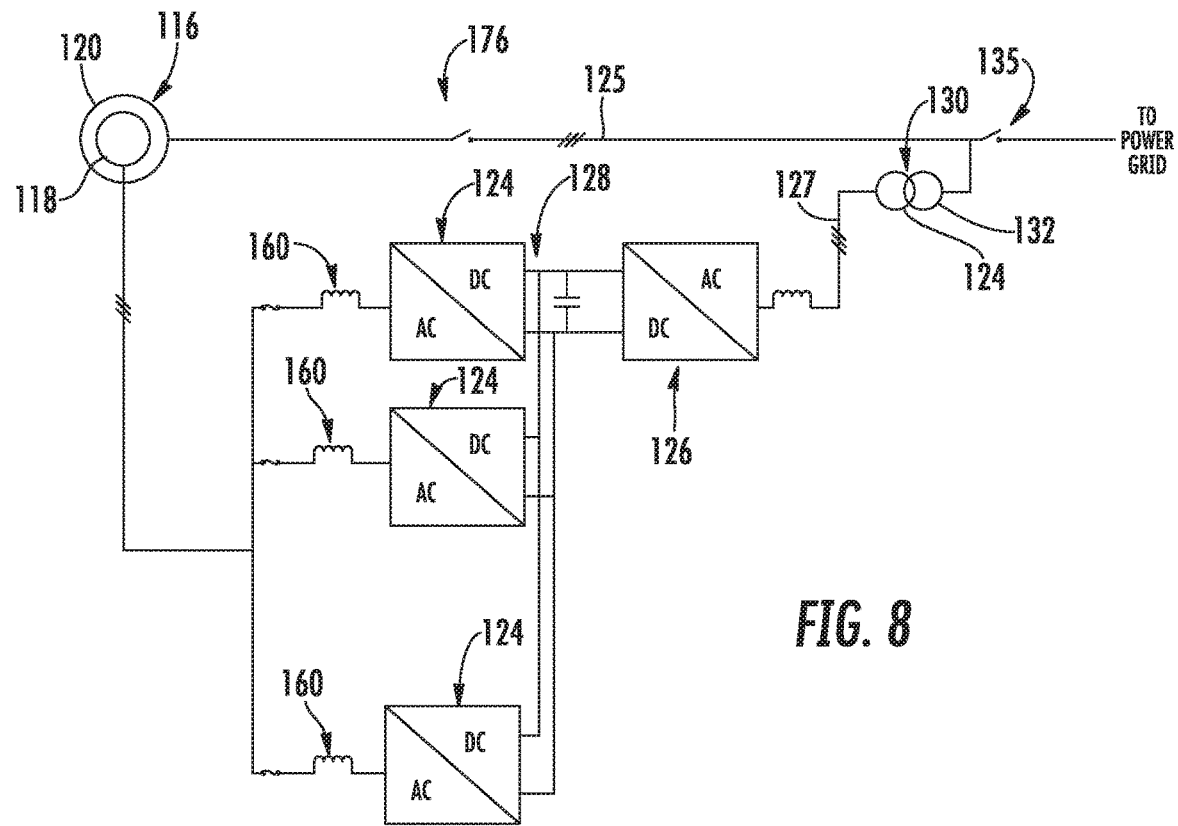
FIG. 8 illustrates a schematic diagram of another embodiment of an electrical power system for a wind turbine including harmonic reduction features according to the present disclosure.
Figure 9:
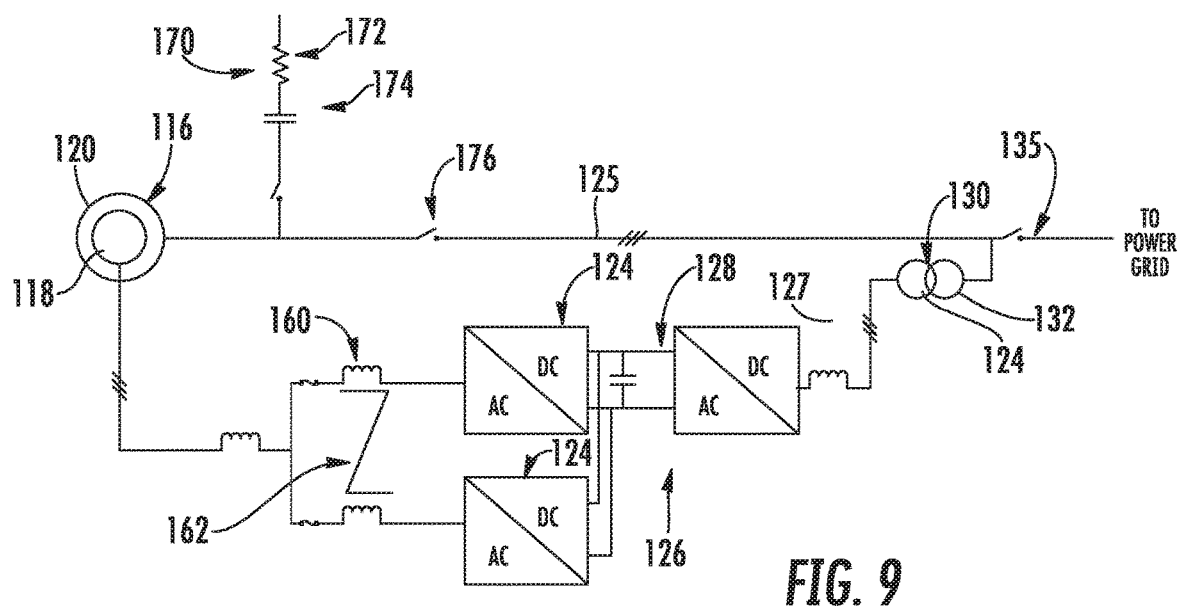
FIG. 9 illustrates a schematic diagram of another embodiment of an electrical power system for a wind turbine including harmonic reduction features according to the present disclosure.

In some embodiments, as illustrated in FIGS. 7 and 8, three or more rotor-side converters 124 may be utilized. In other embodiments, as illustrated in FIG. 9, only two rotor side-converters 124 may be utilized. An inductor 160 may be electrically coupled to each rotor-side converter 124. As particularly illustrated in FIG. 9, in some embodiments, the inductors 160 may be magnetically coupled, such as via an interface or common-mode transformer 162. Such magnetic coupling may aid in harmonics filtering.

As discussed, a controller 154 (which may be separate from or a component of controller 136) may be communicatively coupled to the power converter 122 for controlling operation of the power converter 122. The controller 154 may be communicatively coupled to each of the plurality of rotor-side converters 124, and may thus control modulation of the switching elements (e.g. IGBTs) used in bridge circuits of each rotor side converter 124.

In exemplary embodiments, the controller 154 may be configured to coordinate switching of the plurality of rotor-side converters 124 to produce an interleaved switching pattern between the plurality of rotor-side converters 124. Such interleaved switching pattern may reduce or eliminate harmonics as discussed herein. For example, the controller 154 may shift the switching phase of each the plurality of rotor-side converters 124 to be out of phase with the others of the rotor side converters 124, thus resulting in an interleaved switching pattern. In some embodiments, the phase of each of the plurality of rotor-side converters 124 is shifted from others of the plurality of rotor-side converters 124 by the result of 360 degrees divided by the total number of rotor-side converters, plus or minus 15 degrees, such as plus or minus 10 degrees, such as plus or minus 5 degrees, such as plus or minus 2 degrees. Notably, either the phase of the switching waveform can be shifted and the fundamental reference waveform kept the same or the fundamental reference waveform shifted and the switching waveform kept the same.

For example, in embodiments having two rotor-side converters 124, a first one of the converters 124 may switch at the switching phase with no adjustment and a second one of the converters 124 may have its switching phase adjusted by 180 degrees, such that the phase of each of the two converters 124 is shifted from the other converter 124 by 180 degrees. In embodiments having three rotor-side converters 124, a first one of the converters 124 may switch at the switching phase with no adjustment and the other two converters 124 may have their switching phases adjusted by 120 and 240 degrees, respectively, such that the phase of each of the three converters 124 is shifted from others of the converters 124 by 120 degrees. In embodiments having four rotor-side converters 124, a first one of the converters 124 may switch at the switching phase with no adjustment and the other three converters 124 may have their switching phases adjusted by 90, 180, and 270 degrees, respectively, such that the phase of each of the four converters 124 is shifted from others of the converters 124 by 90 degrees. All of these described examples may utilized exact degrees as described or approximate degrees of plus or minus 15, 10, 5, or 2 degrees.

Figure 10:
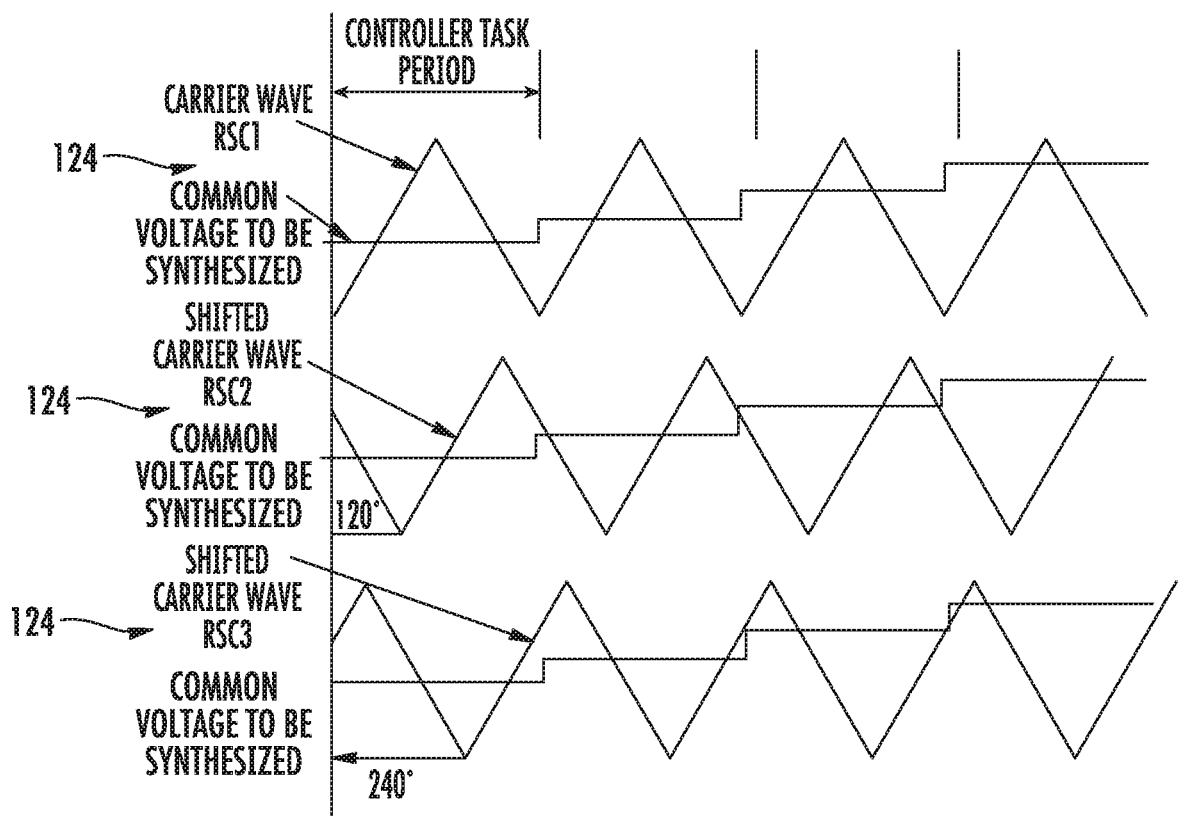
FIG. 10 is a graph illustrating one embodiment of coordinating switching of rotor-side converters to produce an interleaved switching pattern according to the present disclosure.

FIG. 10 is a graph illustrating one embodiment of coordinating switching of rotor-side converters 124 to produce an interleaved switching pattern. In this embodiment, three converters 124 are utilized, as shown. As a result of such shifting the carrier wave for each converter 124 is shifted to produce an interleaved switching pattern.

In some embodiments, as illustrated in FIGS. 7 and 9, the substation 102 may further include a harmonic filter 170. The harmonic filter 170 may, for example, include a resistor 172 and a capacitor 174 in series, or may have another suitable configuration. For example, in some embodiments, the harmonic filter 170 may be on the converter power path 127, such as between the generator rotor 118 and the power converter 122, as illustrated in FIG. 7. Alternatively, however the harmonic filter 170 may be located in other advantageous locations since harmonics on the converter power path 127 may be minimized. For example, as illustrated in FIG. 9, the harmonic filter 170 may be on the stator power path 125, such as between a stator power path synch switch or contractor 176 and the generator stator 120. In still other embodiments, no harmonic filter 170 may be necessary in the substation 102, as illustrated in FIG. 8.

The present disclosure is further directed to methods for operating electrical power subsystems 102 as discussed herein. Such methods may, for example, be performed by a controller 154. A method may include, for example, the step of switching the plurality of rotor-side converters 124 to produce an interleaved switching pattern between the plurality of rotor-side converters 124.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An electrical power subsystem for connection to a power grid, the electrical power subsystem comprising:
   a generator comprising a generator stator and a generator rotor;
   a power converter electrically coupled to the generator, the power converter comprising:
      a plurality of rotor-side converters electrically coupled in parallel;
      a line-side converter; and
      a regulated DC link electrically coupling the plurality of rotor-side converters and the line-side converter;
   a stator power path for providing power from the generator stator to the power grid;
   a converter power path for providing power from the generator rotor through the power converter to the power grid;
   a plurality of inductors, each inductor coupled to the converter power path between the generator and one of the plurality of rotor-side converters, the plurality of inductors including a first inductor, a second inductor in parallel with the first inductor and magnetically coupled to the first inductor via a transformer, and a third inductor in series with the first and second inductors;
   a partial power transformer provided on the converter power path; and
   a harmonic filter coupled to the stator power path between the generator rotor and the power grid.

2. The electrical power subsystem of claim 1, wherein the plurality of rotor-side converters comprises three or more rotor-side converters.

3. The electrical power subsystem of claim 1, wherein the plurality of rotor-side converters consists of two rotor-side converters.

4. The electrical power subsystem of claim 1, further comprising a controller coupled to the power converter, the controller configured to coordinate switching of the plurality of rotor-side converters to produce an interleaved switching pattern between the plurality of rotor-side converters.

5. The electrical power subsystem of claim 4, wherein the phase of each of the plurality of rotor-side converters is shifted from others of the plurality of rotor-side converters by the result of 360 degrees divided by the total number of rotor-side converters, plus or minus 15 degrees.

6. An electrical power subsystem for connection to a power grid, the electrical power subsystem comprising:
   a generator comprising a generator stator and a generator rotor;
   a power converter electrically coupled to the generator, the power converter comprising:
      a plurality of rotor-side converters electrically coupled in parallel;
      a line-side converter; and
      a regulated DC link electrically coupling the plurality of rotor-side converters and the line-side converter;
   a stator power path for providing power from the generator stator to the power grid;
   a converter power path for providing power from the generator rotor through the power converter to the power grid;
   a plurality of inductors, each inductor coupled to the converter power path between the generator and one of the plurality of rotor-side converters, the plurality of inductors including a first inductor, a second inductor in parallel with the first inductor and magnetically coupled to the first inductor via a transformer, and a third inductor in series with the first and second inductors;
   a harmonic filter coupled to the stator power path between the generator rotor and the power grid;
   a partial power transformer connecting the subsystem to the power grid; and
   a controller coupled to the power converter, the controller configured to coordinate switching of the plurality of rotor-side converters to produce an interleaved switching pattern between the plurality of rotor-side converters.

7. The electrical power subsystem of claim 6, wherein the partial power transformer is provided on the converter power path.

8. The electrical power subsystem of claim 6, wherein the plurality of rotor-side converters comprises three or more rotor-side converters.

9. The electrical power subsystem of claim 6, wherein the plurality of rotor-side converters consists of two rotor-side converters.

10. The electrical power subsystem of claim 6, wherein the phase of each of the plurality of rotor-side converters is shifted from others of the plurality of rotor-side converters by the result of 360 degrees divided by the total number of rotor-side converters, plus or minus 15 degrees.

* * * * *